(12) United States Patent
Contreras et al.

(10) Patent No.: US 9,030,770 B2
(45) Date of Patent: May 12, 2015

(54) PROGRAMMABLE ANALOG FEED-FORWARD TIMER FOR DYNAMIC WAVE SHAPING

(71) Applicant: HGST Netherlands B.V., Amsterdam (NL)

(72) Inventors: John Thomas Contreras, Palo Alto, CA (US); Samir Y. Garzon, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/666,966

(22) Filed: Nov. 2, 2012

(65) Prior Publication Data

US 2014/0126077 A1 May 8, 2014

(51) Int. Cl.
*G11B 5/02* (2006.01)

(52) U.S. Cl.
CPC .......................................... *G11B 5/02* (2013.01)

(58) Field of Classification Search
CPC ............ G11B 5/02; G11B 5/022; G11B 5/09; G11B 2005/001; G11B 2005/0013; G11B 20/100027
USPC .......... 369/46; 360/39, 55, 46, 61, 66, 67, 68, 360/71; 327/108
See application file for complete search history.

(56) References Cited

U.S. PATENT DOCUMENTS

| | | | |
|---|---|---|---|
| 5,869,988 A * | 2/1999 | Jusuf et al. | 327/110 |
| 6,587,296 B1 * | 7/2003 | Iroaga et al. | 360/63 |
| 6,826,003 B1 | 11/2004 | Subrahmanyam | |
| 6,930,846 B2 * | 8/2005 | Nakamura | 360/46 |
| 7,035,028 B2 * | 4/2006 | Venca et al. | 360/46 |
| 7,212,361 B1 * | 5/2007 | Pederson et al. | 360/31 |
| 7,522,369 B1 * | 4/2009 | Rahgozar et al. | 360/75 |
| 7,602,857 B2 | 10/2009 | Dally | |
| 7,602,858 B2 | 10/2009 | Dally | |
| 7,715,494 B2 | 5/2010 | Dally | |
| 7,796,355 B2 * | 9/2010 | Benakli et al. | 360/68 |
| 2002/0141094 A1 * | 10/2002 | Suzuki et al. | 360/68 |
| 2004/0070862 A1 * | 4/2004 | Ranmuthu | 360/68 |
| 2004/0196581 A1 * | 10/2004 | VanEaton et al. | 360/46 |
| 2006/0268443 A1 * | 11/2006 | Ranmuthu | 360/68 |
| 2010/0079912 A1 * | 4/2010 | Hama et al. | 360/118 |
| 2010/0232053 A1 * | 9/2010 | Yano et al. | 360/75 |
| 2013/0128375 A1 * | 5/2013 | Livshitz et al. | 360/48 |

* cited by examiner

*Primary Examiner* — Thomas Alunkal
(74) *Attorney, Agent, or Firm* — G. Marlin Knight

(57) ABSTRACT

A Dynamic Wave-Shaping (DWS) write driver for use in a preamp in a disk drive is described. The DWS write driver includes a Dynamic Current Booster (DCB) that adds a current component (WDCB) to the standard write driver signal (including overshoot) that is a function of the bit spacing in the write data input waveform supplied to the write driver. The invention allows dynamic control of the bit-pattern dependent overshoot amplitude without requiring significant preamp overhead. Embodiments of the Dynamic Current Booster include a programmable analog feed-forward timer at the preamp level. The boost current amplitude is a function of the time between the transitions that represent bits. In embodiments, the polarity of the boost current WDCB can be programmed to be positive or negative.

20 Claims, 3 Drawing Sheets

PROGRAMMABLE ANALOG FEED-FORWARD TIMER FOR DYNAMIC WAVE SHAPING

FIELD OF THE INVENTION

The invention relates to wave shaping techniques and devices and particularly to wave shaping techniques as are used in write drivers in disk drives.

BACKGROUND

Disk drives typically include a main integrated circuit, which is typically a system-on-a-chip (SOC) that contains many of the electronics and firmware for the drive. The heads are mounted on movable actuators that also contain the preamp IC for the heads. A flex cable connects the SOC to the preamps. The preamps include digital circuitry that includes registers that are set using serial data from the SOC to provide parameters for the preamps functions.

The preamp includes a write driver that generates an analog signal that is applied to the inductive coil in the write head to write data by selectively magnetizing portions of the magnetic material on the surface of the rotating disk. Magnetic transitions representing bits are written into the magnetic material by reversing the current through the write head (writer) coil. Preamp registers can be set to adjust the current magnitude (Iw) and the overshoot amplitude (OSA) and duration (OSD) in order to saturate the media and minimize the magnetic transition (bit) length.

Certain bit patterns present difficulties for write drive signal generation. For example, closely spaced transitions can introduce non-linear bit shift. Conventional disk drives also employ a write-precompensation circuit which compensates for non-linear bit shift. U.S. Pat. No. 6,826,003 to Subrahmanyam (Nov. 30, 2004) describes another approach for disk drive with a pattern dependent overshoot circuit for controlling write current overshoot. Subrahmanyam '003 proposes that a pattern detector can find a particular bit sequence and modify the overshoot amplitude or write current used to write that particular bit sequence. However, comparing the incoming write data with a particular stored sequence at the preamp level will require large preamp overhead (area) and its implementation is challenging. On the other hand, if the pattern detector is implemented in the read/write channel, a digital line between channel and preamp that operates at the channel clock frequency will be necessary to enable/disable the additional overshoot or write current setting. In this case, additional circuitry to perform analog/digital signal addition within a channel clock step must be implemented at the preamp, which is also quite challenging given the prior art. The invention described herein avoids all of these difficulties by replacing the pattern detector with a programmable dynamic wave-shaping write driver.

SUMMARY OF THE INVENTION

Embodiments of the invention include a Dynamic Wave-Shaping (DWS) write driver for use in a preamp in a disk drive. The DWS write driver includes a Dynamic Current Booster (DCB) that adds a transient current component (WDCB) to the standard write driver signal (including overshoot) that is a function of the bit spacing in the write data input waveform supplied to the write driver. The invention allows dynamic control of the bit-pattern dependent overshoot amplitude without requiring significant preamp overhead. Embodiments of the Dynamic Current Booster include a programmable analog feed-forward timer at the preamp level. The longer the time between the transitions that represent bits, the higher the boost current WDCB that is added to write drive signal for a transition. In an embodiment the timer is implemented as programmable bidirectional current source connected in series with a capacitor to generate a voltage that is a linear function of the time between bit transitions. The amplitude and polarity of the charging current can be controlled by a value set in a register using the serial communication line to the preamp from the disk drive's R/W electronics. The amplitude and polarity parameters for the boost current according to the invention can be set for the standard track zones by self-testing performed by the drive as is done for write current, OSA and OSD as part of the manufacturing process.

A Data Transition Detector (DTD) is used to reset the voltage at each transition and thereby reset the timer. The peak voltage at the transition is latched and then used to control the boost component of the write driver signal for the transition. The voltage is then fed into a transconductance amplifier to generate a corresponding current. A predetermined limit on the boost current can be implemented by limiting the voltage that is fed to the transconductance amplifier. For positive polarities of the charging current, the boost current WDCB has the same polarity as the write current Iw and overshoot amplitude: positive for positive transitions and negative for negative transitions and is then used along with the conventionally generated baseline and overshoot currents to form a pulse in the write driver signal with the appropriate sign. For negative polarities of the charging current, the boost current WDCB will be opposite to the writer baseline current, and therefore the preset overshoot amplitude will be reduced. In this case longer bit spacings will produce less overshoot amplitude. Therefore by selecting the polarity of the charging current it is possible to obtain either increasing or decreasing overshoot amplitude for longer bit spacing.

DETAILED DESCRIPTION OF THE INVENTION

Figure 1:
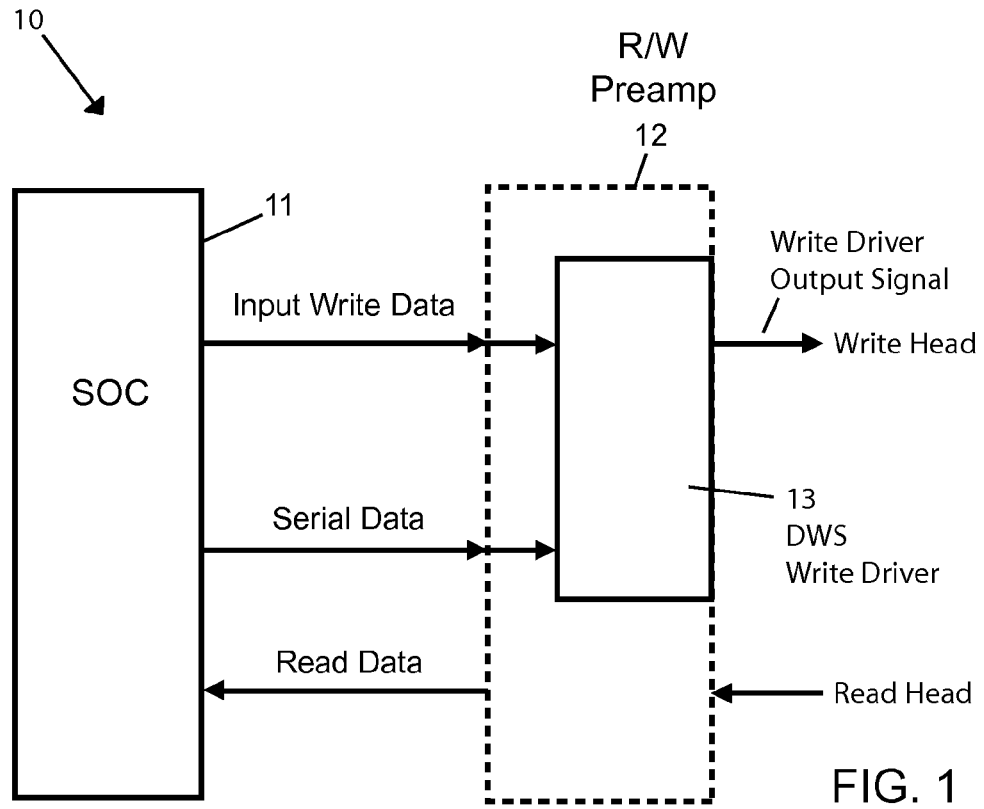
FIG. 1 is a block diagram illustration of selected components of a disk drive with a preamp that includes a Dynamic Wave-Shaping (DWS) write driver according to an embodiment of the invention.

FIG. 1 is a block diagram illustration of selected components of a disk drive 10 with a read/write (R/W) preamp 12 that includes a Dynamic Wave Shaping (DWS) write driver 13 according to an embodiment of the invention. Only one preamp 12 is shown, but a disk drive will typically have one preamp for each of the heads included in the disk drive. The preamp 12 sends and receives signals from the system on a chip (SOC) 11 using standard communication techniques. The data sent from the SOC includes serial data that is used to set registers with values for parameters that affect/control the functions of the preamp. The Dynamic Wave Shaping (DWS) write driver 13 generates the drive signal for the write head.

Figure 2:
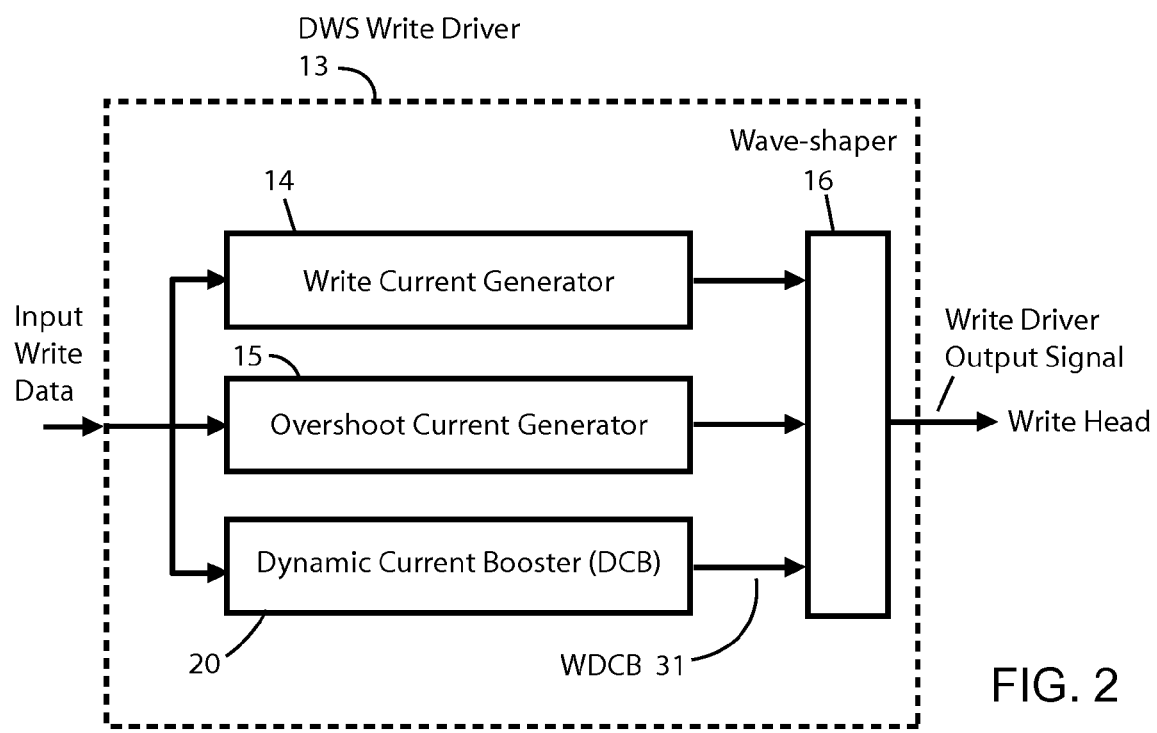
FIG. 2 is a block diagram illustration of selected components of a Dynamic Wave-Shaping (DWS) write driver according to an embodiment of the invention.

FIG. 2 is a block diagram illustration of selected components of a Dynamic Wave Shaping (DWS) write driver 13 according to an embodiment of the invention. The DWS write driver 13 includes three current generators that each use the standard write driver input data ("Input WD") as input. Registers (not shown) in the DWS write driver 13 that are set using serial data from the SOC affect the function of the three current generators. The write current generator 14 generates the baseline current Iw with an amplitude according to a parameter in a register (not shown). The overshoot current generator 15 generates an overshoot current with an amplitude and overshoot duration that are controlled by parameters set in registers (not shown). Both the write current generator 14 and overshoot current generator 15 can function according to prior art principles. The DWS write driver 13 also includes Dynamic Current Booster 20 which generates a current signal WDCB 31 that is added to the baseline current and the overshoot current by wave shaper 16 to generate the complete write driver output signal with the appropriate sign which goes to the write head.

Figure 3:
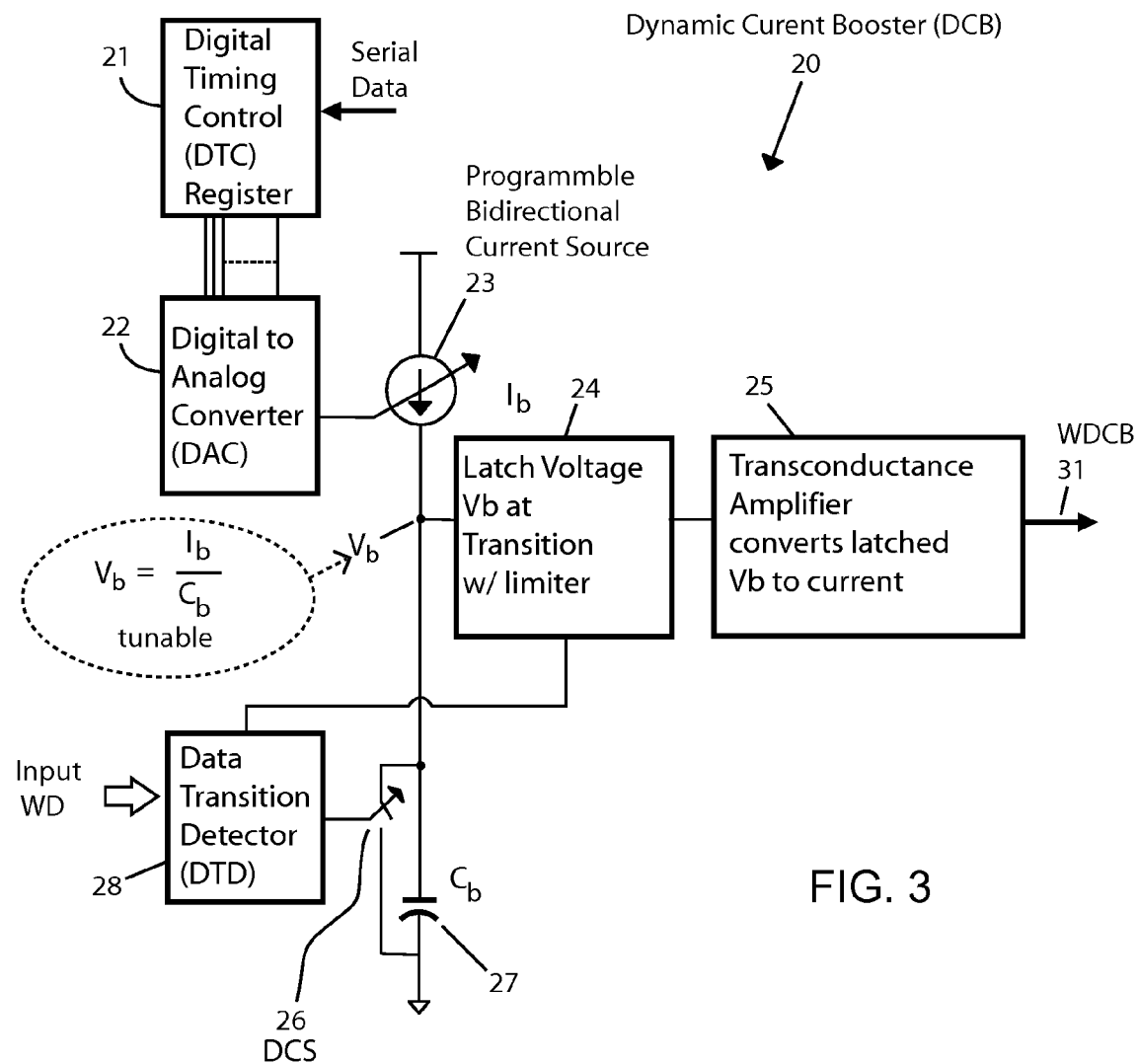
FIG. 3 is a block diagram illustration of selected components of a Dynamic Current Booster component in a Dynamic Wave-Shaping (DWS) write driver according to an embodiment of the invention.

FIG. 3 is a block diagram illustration of selected components of a Dynamic Current Booster (DCB) 20 component in a Dynamic Wave Shaping (DWS) write driver 13 according to an embodiment of the invention. Dynamic Current Booster 20 generates the dynamic write driver current boost (WDCB) signal using a programmable feed-forward timer circuit to modify the write current overshoot amplitude depending on the time between successive magnetic transitions in the write driver input data ("Input WD"). In contrast with prior art, there is no need for pattern detection. Instead, a charge accumulating circuit timed by successive write current transitions is used to create a pattern dependent boost.

Figure 4:
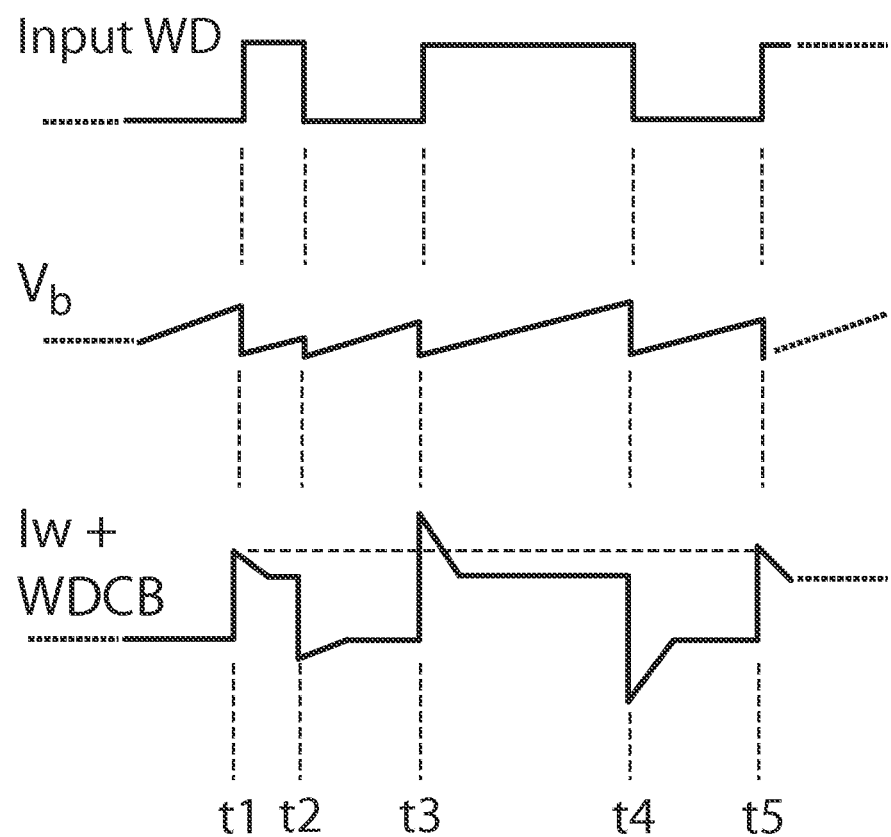
FIG. 4 is an illustration of selected waveforms in a Dynamic Wave-Shaping (DWS) write driver according to an embodiment of the invention.

The programmable feed-forward timer circuit programs the write current boost dynamically using analog signals. A timer that measures time intervals between transitions in the write data input signal is implemented by programmable bidirectional current source 23 which is connected in series with capacitor 27. The timing (boost) voltage $V_b$, which is illustrated in FIG. 4, is generated by a constant from current source 23 charging capacitor 27. The voltage $V_b$ increases linearly between resets to form a sawtooth pattern in which the peak amplitude is a function of the time from the last reset. Resets occur at each transition in the input data stream which varies according to the bit values (transitions) in the data.

The input write data (WD) transitions are detected by the Data Transition Detector (DTD) 28 which resets (or discharges) the capacitor 27 at each transition by shorting out the capacitor 27 by momentarily closing switch 26 which is connected in parallel with capacitor 27. The voltage $V_b$ drops to a sufficiently low value to serve as a base value for the timer function. As long as the minimum voltage $V_b$ is within a small range for each reset, the absolute value is not significant.

The peak $V_b$ voltage is latched by latch 24, which also receives a control signal from the DTD. The DTD sends two signals: first one to the latch, and then, with a small delay, another copy of the signal to the DCS to reset the capacitor. The delay can be set using a register at the preamp. The latch resets after an appropriate time delay to allow the cycle to repeat. The latched boost voltage $V_b$ determines that transition's dynamic current boost value, i.e. how much additional current appears at the output of the write driver (Output WD). A predetermined limit on the boost current can be implemented by limiting the $V_b$ voltage.

The $V_b$ voltage is fed to the transconductance amplifier 25 which converts the voltage into a current that is the output WDCB 31. The boost current WDCB in this embodiment will have the same polarity as the write current Iw and overshoot amplitude: positive for positive transitions and negative for negative transitions and is then used along with the conventionally generated baseline and overshoot currents to form a pulse in the write driver signal with the appropriate sign. For negative polarities of the charging current $I_b$ from current source 23, the additional overshoot will be opposite to the writer current 14, and therefore the preset overshoot amplitude will be reduced. In this case longer bit spacings will produce less overshoot amplitude. Therefore by selecting the polarity of the charging current it is possible to obtain either increasing or decreasing overshoot amplitude for longer bit spacing.

The purpose for having either a positive or a negative charging current from programmable bidirectional current source 23 in this embodiment is to be able to control whether longer bit spacings will have either additional or reduced current overshoot. For a positive charging current, the larger the bit spacing, the larger the positive voltage that builds up at the capacitor 27, and therefore the larger the amount of dynamic overshoot added to the current. For a negative current, larger bit spacings will end up with more negative voltage build up and therefore a larger dynamic overshoot will be subtracted from the total current. In an alternative embodiment, if a constant polarity current is used, then at the current adder there should be switching means to select whether to add or subtract the dynamic overshoot from the other two currents. One embodiment of the invention might use a relatively large fixed-overshoot setting and use the Dynamic Current Booster (DCB) with a negative charging current to decrease the overshoot amount as bit spacing gets larger.

The amplitude and direction of the charging current are determined during optimization of the drive, at the same time that the write current, OSA, and OSD settings are adjusted during the standard manufacturing process. Once the traditional optimization is run, then there would be an additional optimization sequence to scan through a range of charging current values used by the invention, which could include exploring both charging current polarities. One possibility is to exhaustively scan a subset of drives to set population ranges and then a small subset of values could be tested for all drives.

The amplitude and direction parameters for the boost current according to the invention can be set for the standard track zones by self-testing performed by the drive as is done for write current, OSA and OSD as part of the manufacturing process. Once the settings for each zone are established for a particular disk drive, they do not need to be changed. Each zone can have different settings, but once all zones are programmed, the settings can remain constant throughout the life of the drive as is the prior art practice for the write driver parameter for write current, OSA and OSD.

The operation of the DCB 20 is affected by the parameter that is set in Digital Timing Control (DTC) register 21 by serial data supplied to the preamp by the SOC. The parameter in DTC register 21 is converted into an analog control signal by Digital-to-Analog Converter (DAC) 22. The analog control signal output by the DAC 22 is connected to programmable constant current source 23 to select the amplitude and polarity of the constant current $I_b$ which charges capacitor 27. The amplitude of the charging current can be adjusted by using the DTC register to obtain different amounts of additional overshoot: small (large) currents lead to small (large) additional overshoot for longer bit spacings. Positive (negative) charging current polarities lead to increasing (decreasing) overshoot for longer bit spacings. The value for the DTC register 21 can be empirically determined for a particular design and disk zone and will generally not need to be updated except between zones.

For simplicity FIG. 4 shows the dynamic boost overshoot current WDCB combined only with the baseline write driver current Iw that is produced by write current generator 14. FIG. 4 illustrates that longer transition intervals, e.g., t2 to t3, in the input WD will generate larger $V_b$ voltage latched voltages and therefore larger overshoot amplitudes. The WDCB provides a transient boost to the current Iw. The duration of the WDCB is less than the minimum transition interval illustrated as t1 to t2. The WDCB adds a peak to current Iw for the transition and then declines relatively quickly in the same way as the conventional implementation of the OSA.

The invention claimed is:

1. A preamplifier comprising:
a write current generator that receives a write data input signal and produces a baseline output current for a write head to write magnetic transitions that encode the write data input signal; and
a dynamic current booster that receives the write data input signal that includes transitions that are variably spaced and produces a transient boost current that is added to the baseline output current, the dynamic current booster including a timer that measures time intervals between transitions in the write data input signal, the transient boost current varying as a function of a measured time between transitions in the write data input signal so that a peak amplitude of the transient boost current increases when the measured time between transitions increases.

2. The preamplifier of claim 1 wherein the transient boost current has a selectable positive or negative polarity.

3. The preamplifier of claim 1 wherein the dynamic current booster further comprises a data transition detector that resets the timer whenever any transition is detected in the write data input signal.

4. The preamplifier of claim 1 wherein the timer in the dynamic current booster further comprises a current source connected in series with a capacitor to generate a boost voltage that is a linear function of the time between transitions and wherein the transient boost current is generated using the boost voltage.

5. The preamplifier of claim 4 wherein the dynamic current booster further comprises a latch that temporarily saves the peak boost voltage.

6. The preamplifier of claim 4 wherein the dynamic current booster further comprises a switch connected in parallel with the capacitor; and a data transition detector that resets the timer when a transition is detected by momentarily closing the switch to discharge the capacitor and reduce the boost voltage to a minimum value.

7. The preamplifier of claim 6 wherein the dynamic current booster further comprises a transconductance amplifier that converts the peak boost voltage into the transient boost current.

8. The preamplifier of claim 4 wherein the dynamic current booster further comprises a register that contains a parameter that affects an amplitude of the current generated by the current source and wherein the parameter is set using serial data received by the preamp.

9. The preamplifier of claim 8 wherein the dynamic current booster further comprises a digital to analog converter that converts the parameter into an analog control signal connected to the current source and wherein the analog control signal controls the amplitude of the current generated by the current source.

10. The preamplifier of claim 1 wherein the dynamic current booster further comprises means for limiting the transient boost current to a maximum value.

11. A disk drive comprising:
system electronics that supplies a write data input signal; and
a write driver that receives the write data input signal that includes transitions that are variably spaced, the write driver including:
a write current generator that produces a baseline output current for a write head to write magnetic transitions that encode the write data input signal;
a dynamic current booster that produces a transient boost current component that is added to the baseline output current, the dynamic current booster including a timer that measures time intervals between transitions in the write data input signal, the transient boost current varying as a function of a measured time between transitions in the write data input signal so that a peak amplitude of the transient boost current increases when the measured time between transitions increases.

12. The disk drive of claim 11 wherein the dynamic current booster further comprises a data transition detector that resets the timer whenever any transition is detected in the write data input signal.

13. The disk drive of claim 11 wherein the timer in the dynamic current booster further comprises a current source connected in series with a capacitor to generate a boost voltage that is a linear function of the time between transitions in the write data input signal and wherein the transient boost current is generated using the boost voltage.

14. The disk drive of claim 13 wherein the dynamic current booster further comprises a latch that saves a peak boost voltage and a transconductance amplifier that converts the peak boost voltage into the transient boost current.

15. The disk drive of claim 13 wherein the dynamic current booster further comprises a switch connected in parallel with the capacitor; and a data transition detector that resets the timer when a transition is detected by momentarily closing the switch to discharge the capacitor and reduce the boost voltage to a minimum value.

16. The disk drive of claim 13 wherein the dynamic current booster further comprises a register that contains a parameter that affects an amplitude of the current generated by the current source and wherein the parameter is set using serial data received from the system electronics.

17. The disk drive of claim 13 wherein the dynamic current booster further comprises a digital to analog converter that converts the parameter into an analog control signal connected to the current source and wherein the analog control signal controls the amplitude of the current generated by the current source.

18. The disk drive of claim 13 wherein the dynamic current booster further comprises a digital to analog converter that converts the parameter into an analog control signal connected to the current source and wherein the analog control signal controls the amplitude and direction of the current generated by the current source.

19. The disk drive of claim 13 wherein the current source is a programmable bidirectional current source.

20. The disk drive of claim 11 wherein the dynamic current booster further comprises means for limiting the transient boost current to a maximum value.

* * * * *